Feb. 21, 1956 — D. C. POWELL — 2,735,728
TRACK STRUCTURE FOR TRACK-LAYING VEHICLES
Filed June 24, 1952 — 2 Sheets-Sheet 1
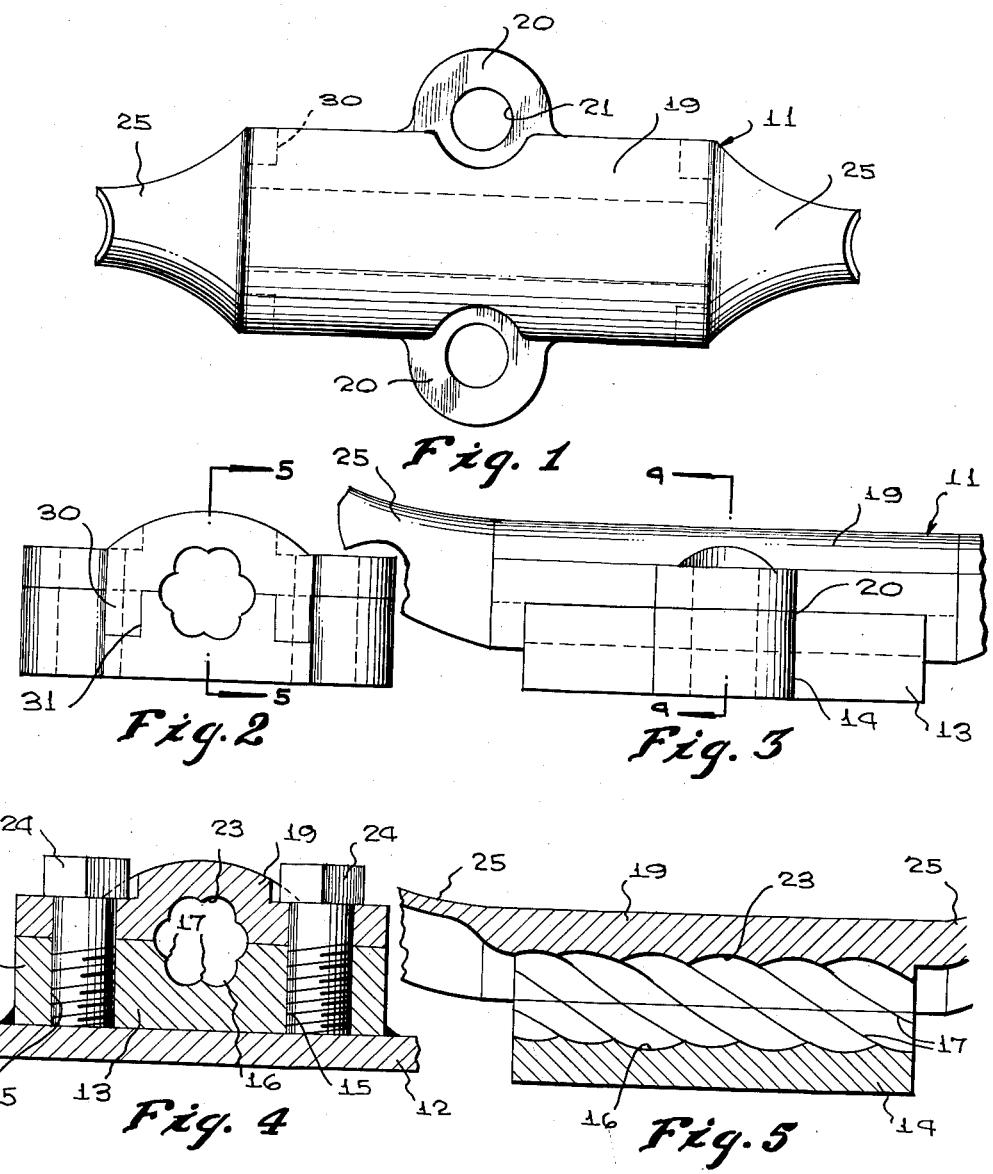
INVENTOR.
Dana C. Powell
BY
McMorrow, Berman + Davidson
ATTORNEYS Feb. 21, 1956  D. C. POWELL  2,735,728
TRACK STRUCTURE FOR TRACK-LAYING VEHICLES
Filed June 24, 1952  2 Sheets-Sheet 2

INVENTOR.
Dana C. Powell
BY
McMorrow, Berman & Davidson
ATTORNEYS

United States Patent Office 2,735,728
Patented Feb. 21, 1956

2,735,728

TRACK STRUCTURE FOR TRACK-LAYING VEHICLES

Dana C. Powell, Live Oak, Fla.

Application June 24, 1952, Serial No. 295,168

4 Claims. (Cl. 305—10)

This invention relates to improvements in endless track structures for track-laying vehicles.

The main object of the invention is to provide a novel and improved means for clamping the shoes of track-laying vehicles to the connecting cables thereof, the improved clamping means being simple in construction, being easy to install, and serving to reduce wear on adjacent portions of the track structure and sprocket elements, whereby the useful life of said adjacent elements is greatly increased.

A further object of the invention is to provide an improved means for clamping the shoes of track-laying vehicles to the connecting cables thereof, the improved clamping means involving inexpensive parts, being rugged in construction, and being arranged to distribute the clamping force on the connecting cables, whereby the unit stresses in the cables are minimized and whereby friction on the adjacent pins and bushings of the track structure is reduced, increasing the life of the various elements of the vehicle endless track structure.

Further objects and advantages of the invention will become apparent from the following description and claims, and from the accompanying drawings, wherein:

Figure 1 is a plan view of one of the clamping assemblies for connecting the cable of an endless track structure to the shoes thereof.

Figure 2 is an end elevational view of the clamping device of Figure 1.

Figure 3 is a fragmentary side elevational view of the clamping device of Figure 1.

Figure 4 is a transverse vertical cross sectional view taken on the line 4—4 of Figure 3, showing the clamping device secured to a tractor shoe.

Figure 5 is a fragmentary vertical longitudinal cross sectional view taken on the line 5—5 of Figure 2.

Figure 6:
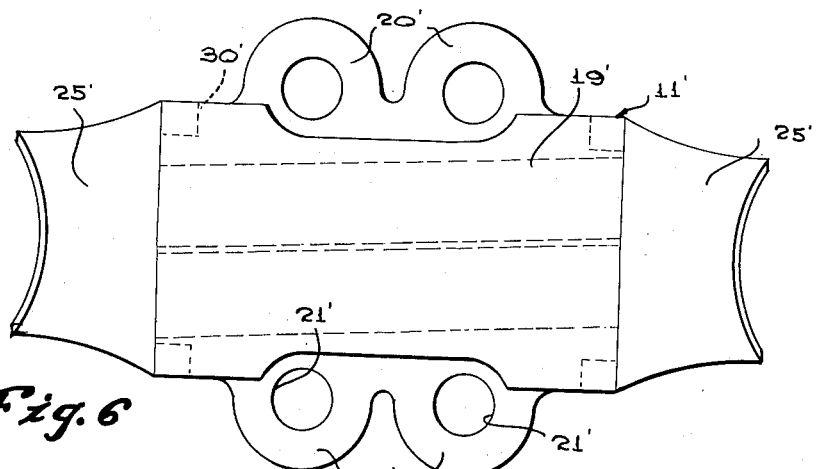
Figure 6 is a plan view of a clamping block assembly adapted to receive and clamp the ends of the shoe-connecting cable of an endless track structure.

Referring to the drawings, and more particularly to Figures 1 to 5, 11 designates a clamping block assembly for clamping the connecting cable of an endless track structure to a track shoe, such as the track shoe 12 shown in Figure 4. Welded to the shoe 12 is a first block 13 formed with the oppositely extending lugs 14, 14 at its respective sides, said lugs being located substantially at the intermediate portions of the sides of the block 13. Each lug 14 is formed with an internally threaded aperture 15. The block 13 is formed with a longitudinally extending groove 16, said groove being formed with helical corrugations 17 adapted to interfit between the strands of the steel connecting cable 18 employed to connect the track shoes of the tractor. Designated at 19 is a second block member arranged to overlie the block 13, the block 19 being formed with the respective side lugs 20, 20 having the apertures 21 registering with the internally threaded openings 15 of the lugs 14 when the block 19 is placed over the block 13 in registry therewith, as shown in Figures 2, 3 and 4. The block 19 is formed with the longitudinally extending groove 23 which is registrable with the groove 23, the groove 23 being formed with helical corrugations, similar to the corrugations 17, which merge with the corrugations 17 and are adapted to fit between adjacent strands of the cable 18. Extending through the openings 21 and threadedly engaged in the openings 15 are the respective clamping bolts 24, 24 which, when tightened, clamp the block 19 to the block 13 and cause the cable 18 to be clampingly engaged between the blocks. The block 19 is provided at its opposite ends with the respective curved channel-shaped extensions 25, 25, the extensions 25 being arcuately curved upwardly, as viewed in Figures 3 and 5 to provide clearance for the portions of cable 18 between adjacent clamping assemblies. The extensions 25, 25 are made arcuate in shape to allow free angling of the shoes 12 relative to each other as said shoes progress around the sprocket wheels of the track-laying vehicle.

Figures 9, 10:
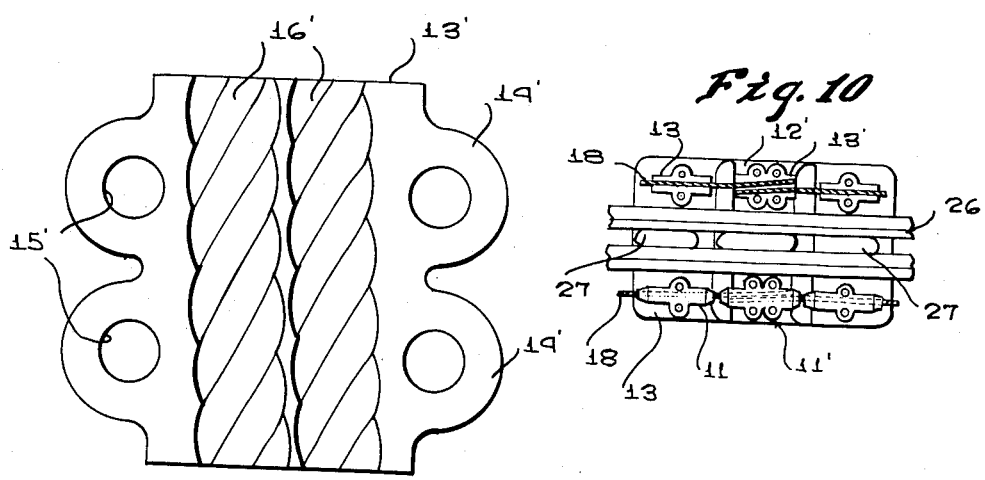
Figure 9 is a plan view of the lower clamping block of Figures 6, 7 and 8.
Figure 10 is a fragmentary view of a portion of the vehicle track structure showing a plurality of shoes, portions of the shoe-connecting cables, and the clamping block assemblies, certain of the assemblies having their outer clamping blocks removed to illustrate the manner in which the ends of the cables are secured to the track structure.

Referring to Figure 10, 26 designates a portion of a conventional track, said track being, for example, a portion of the periphery of one of the track wheels of a track-laying vehicle, and being provided with the rollers or sprocket elements 27 adapted to engage respectively in recesses formed in the respective track shoes 13. The cable clamping assemblies 11 are arranged on opposite sides of the track 26, as shown in Figure 10, and the connecting cables 18, 18 are secured in said assemblies in the manner above described. The ends of the cables 18, 18 are clamped in terminating block assemblies 11′ secured to one of the track shoes, shown at 12′.

Figures 7, 8:
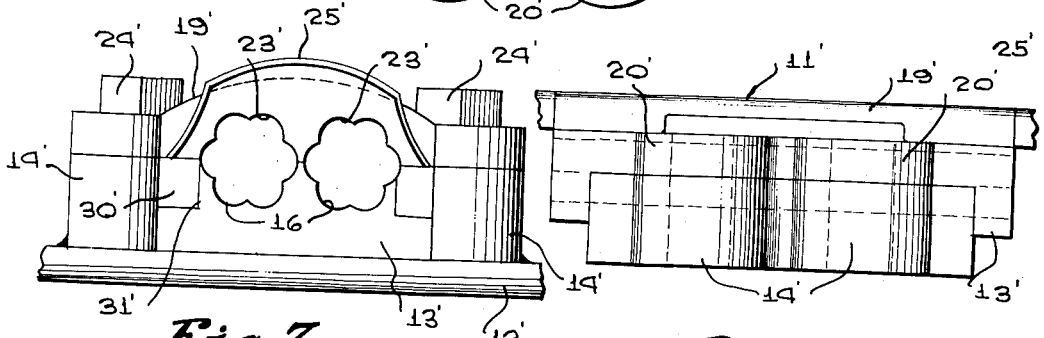
Figure 7 is an end elevational view of the clamping assembly of Figure 6, shown secured to a tractor shoe.
Figure 8 is a fragmentary side elevational view of the clamping block assembly of Figure 6.

Referring to Figures 6 to 9, the terminating clamping assembly 12′ comprises a first block member 13′ which is welded to the track shoe 12′, as shown in Figure 7. The block 13′ is provided with a pair of lugs 14′, 14′ on each side thereof, said lugs being formed with the internally threaded openings 15′. Designated at 19′ is a second block member disposed over the block 13′, the second block member 19′ being provided with the respective pairs of lugs 20, 20 on the opposite sides thereof, said lugs being formed with the openings 21′ arranged to register with the internally threaded openings 15′ when the block 19′ is disposed over the block 13′ in registering relationship therewith. The block 13′ is formed with the parallel grooves 16′, 16′, arranged in side-by-side relationship, said grooves 16′ having the spiral corrugations 17′ adapted to fit between adjacent strands of the ends of the shoe-connecting cable 18 when said ends are placed in the grooves 16′. The block member 19′ is formed with the side-by-side grooves 23′, 23′ arranged to register with the respective grooves 16′, 16′ in the manner shown in Figure 7, the grooves 23′ being similarly formed with spiral corrugations adapted to fit between adjacent strands of the cable ends 18. Respective clamping bolts 24′, 24′ are provided on each side of the block assembly, extending through the openings 21′ and threadedly engaged in the openings 15′ to clamp the black member 19′ to the block member 13' and to thereby clamp the cable ends in the assembly.

The block member 19' is formed at its ends with the arcuately curved, channel-shaped extensions 25', 25' which are arcuately curved upwardly, as viewed in Figure 7 to provide clearance for the portions of the cables 18 at the opposite ends of the assembly 12' and to allow the cable to flex freely when the shoe 12' passes around the periphery of the track wheel.

It will be noted that the cable 18 is securely gripped and that the clamping pressure thereon is distributed substantially evenly along the portions of the cable secured between the blocks 19 and 13, and that the ends of the cable are secured in the clamping assemblies 12' and are securely gripped thereby. The wear on the cables as well as on the adjacent pins and bushings of the track structure is thus minimized and evenly distributed, whereby the operating life of these elements is substantially increased.

To insure accurate registry of the blocks 19 and 19' with their mating blocks 13 and 13', the blocks 19 and 19' are provided with the depending corner lugs 30 and 30' which engage in correspondingly formed recesses 31 and 31' provided in the mating blocks 13 and 13', as shown in Figures 2 and 7.

While a specific embodiment of an improved means for connecting the shoes of a track-laying vehicle has been disclosed in the foregoing description it will be understood that various modifications within the spirit of the invention may occur to those skilled in the art. Therefore, it is intended that no limitations be placed on the invention except as defined by the scope of the appended claims.

What is claimed is:

1. In a track laying vehicle a series of coacting shoes forming a tread surface, each shoe having a track rail engaging plate, an inner block overlying and secured to a side of said plate, said inner block having an outer side and having corners provided with recesses, an outer block overlying said outer side of the inner block, said outer block having an inner side, registered cable clamping grooves in the outer and inner sides of the blocks, positioning lugs depending from said outer block and engaging in said recesses, and means releasably clamping the blocks in superimposed relation.

2. In a track laying vehicle a series of coacting shoes forming a tread surface, each shoe having a track rail engaging plate, an inner block overlying and secured to a side of said plate, said inner block having an outer side and having corners provided with recesses, an outer block overlying said outer side of the inner block, said outer block having an inner side, registered cable clamping grooves in the outer and inner sides of the blocks, positioning lugs depending from said outer block and engaging in said recesses, and means releasably clamping the blocks in superimposed relation, said outer block having corners from which said positioning lugs depend.

3. In a track laying vehicle a series of coacting shoes forming a tread surface, each shoe having a track rail engaging plate, an inner block overlying and secured to a side of said plate, said inner block having an outer side and having corners provided with recesses, an outer block overlying said outer side of the inner block, said outer block having an inner side, registered cable clamping grooves in the outer and inner sides of the blocks, positioning lugs depending from said outer block and engaging in said recesses, said blocks having laterally projecting clamping lugs on opposite sides thereof, the clamping blocks in opposite sides of the blocks being in registry and having registered bores, and clamping bolts traversing the bores of registered clamping lugs and threaded in some of the bores of registered clamping lugs.

4. In a track laying vehicle a series of coacting shoes forming a tread surface, each shoe having a track rail engaging plate, an inner block overlying and secured to a side of said plate, said inner block having an outer side and having corners provided with recesses, an outer block overlying said outer side of the inner block, said outer block having an inner side, registered cable clamping grooves in the outer and inner sides of the blocks, positioning lugs depending from said outer block and engaging in said recesses, said blocks having laterally projecting clamping lugs on their opposite sides, the clamping lugs being substantially shorter than the length of the blocks and in registry with each other at the opposite sides of the blocks, the clamping lugs of the inner block having threaded bores and the clamping lugs of the outer block having bores registered with the threaded bores, and clamping bolts traversing the bores of the clamping lugs of the outer block and threaded in the threaded bores of the inner block clamping lugs.

References Cited in the file of this patent

UNITED STATES PATENTS

| | | |
|---|---|---|
| 427,782 | Mobley | May 13, 1890 |
| 1,765,837 | Keator | June 24, 1930 |
| 2,133,653 | Bomford et al. | Oct. 18, 1938 |
| 2,362,638 | Kilbourn | Nov. 14, 1944 |